(12) United States Patent
Roberts et al.

(10) Patent No.: US 11,067,213 B2
(45) Date of Patent: Jul. 20, 2021

(54) COMPOSITE PIPE END CONNECTOR

(71) Applicant: Magma Global Limited, Hampshire (GB)

(72) Inventors: Richard Damon Goodman Roberts, Hampshire (GB); Charles Alexander Tavner, London (GB); Stephen Hatton, Surrey (GB)

(73) Assignee: Magma Global Limited, Portsmouth (GB)

( * ) Notice: Subject to any disclaimer, the term of this patent is extended or adjusted under 35 U.S.C. 154(b) by 1377 days.

(21) Appl. No.: 14/420,120

(22) PCT Filed: Aug. 5, 2013

(86) PCT No.: PCT/GB2013/052083
§ 371 (c)(1),
(2) Date: Feb. 6, 2015

(87) PCT Pub. No.: WO2014/023943
PCT Pub. Date: Feb. 13, 2014

(65) Prior Publication Data
US 2015/0204472 A1  Jul. 23, 2015

(30) Foreign Application Priority Data
Aug. 6, 2012  (GB) ..................................... 1213913

(51) Int. Cl.
*F16L 47/04*  (2006.01)
*F16L 47/24*  (2006.01)

(52) U.S. Cl.
CPC ............... *F16L 47/04* (2013.01); *F16L 47/24* (2013.01)

(58) Field of Classification Search
CPC .................................. F16L 47/04; F16L 47/24
USPC .......... 285/242, 245–246, 222.1–222.5, 255, 285/290.1–290.3, 353, 290.2, 384–385
See application file for complete search history.

(56) References Cited

U.S. PATENT DOCUMENTS 1,086,641 A * 2/1914 Blume ..................... F16L 33/26
285/222.5
2,457,384 A * 12/1948 Krenz .................... F16L 27/047
285/261
3,222,091 A * 12/1965 Marshall ............... F16L 33/225
285/95

(Continued)

FOREIGN PATENT DOCUMENTS

CA        2011907 A1   2/1991
WO   2001/025667 A1   4/2001

OTHER PUBLICATIONS

Search Report received in corresponding Great Britain application No. GB1213913.5, dated Nov. 30, 2012.

(Continued)

*Primary Examiner* — Matthew Troutman
*Assistant Examiner* — Fannie C Kee
(74) *Attorney, Agent, or Firm* — Levy & Grandinetti

(57) ABSTRACT

A pipe assembly (10) includes a composite pipe (12) having a composite material formed of at least a matrix material and a plurality of reinforcing elements embedded within the matrix material. The pipe assembly (10) further comprises a metallic pipe stub (14) secured to an end region of the composite pipe (12) and configured to support a connector (20) to permit the pipe assembly (10) to be secured to separate infrastructure.

44 Claims, 4 Drawing Sheets

(56) References Cited

U.S. PATENT DOCUMENTS

| | | | | |
|---|---|---|---|---|
| 3,484,123 | A | * | 12/1969 | Van Der Velden .......................... F16L 19/0206 285/341 |
| 4,313,628 | A | * | 2/1982 | Duenke ................... F16L 33/24 285/115 |
| 4,548,428 | A | * | 10/1985 | Ruble ..................... F16L 47/16 285/246 |
| 4,798,404 | A | * | 1/1989 | Iyanicki ................ F16L 19/075 285/12 |
| 4,810,010 | A | * | 3/1989 | Jones ...................... F16C 3/026 285/222.4 |
| 5,330,236 | A | | 7/1994 | Peterjohn et al. |
| 5,351,752 | A | | 10/1994 | Wood et al. |
| 5,383,692 | A | | 1/1995 | Watts |
| 6,361,080 | B1 | | 3/2002 | Walsh et al. |
| 2005/0199308 | A1 | | 9/2005 | Swails et al. |
| 2011/0215569 | A1 | | 9/2011 | Lamik |

OTHER PUBLICATIONS

International Search Report and Written Opinion received in corresponding PCT application No. PCT/GB2013/052083, dated Oct. 22, 2013.

\* cited by examiner

COMPOSITE PIPE END CONNECTOR

FIELD OF THE INVENTION

The present invention relates to a pipe assembly including a composite pipe.

BACKGROUND TO THE INVENTION

Composite pipes are used or have been proposed for use in numerous applications, such as in the oil and gas exploration and production industry for the conveyance of fluids and equipment.

Composite pipes typically include a wall structure composed of reinforcing fibres embedded within a matrix. It is often the case that such composite pipes are intended for use in applications which have typically employed conventional metallic pipes and associated infrastructure, and as such an important design consideration is ensuring compatibility with existing operational conditions and infrastructure. The arrangement of the composite material is a crucial concern to ensure that duty requirements can be met. Also, the ability to provide a connection between the composite pipe and required infrastructure is also a significant consideration. It has been proposed in the art to integrally form a composite connector, such as an end connector with the pipe. This may involve complex composite geometries and manufacturing techniques to be employed.

SUMMARY OF THE INVENTION

According to a first aspect of the present invention there is provided a pipe assembly comprising:

a composite pipe comprising a composite material formed of at least a matrix material and a plurality of reinforcing elements embedded within the matrix material; and a metallic pipe stub secured to an end region of the composite pipe and configured to support a connector to permit the pipe assembly to be secured to separate infrastructure.

Accordingly, the pipe assembly includes a composite pipe and thus exhibits advantages such as light weight, improved strain rate, improved buoyancy, fatigue resistance, thermal properties and the like. Further, the pipe assembly includes a metallic pipe stub which defines an end of the pipe assembly and facilitates connection with separate infrastructure. This arrangement may therefore permit use of conventional connection arrangements which are typically associated with metallic pipe structures and which are proven and accepted in industry (such as the oil and gas industry), including API flanges, Greylock flanges, swivel flanges, pin and box connectors, welded connections and the like.

Furthermore, the particular combination of a composite pipe and connected metallic pipe stub for facilitating connection with separate infrastructure may be such that the pipe stub (and any secured connector and/or infrastructure) is subjected to far lower loads than if it were part of an all steel structure by virtue of the relative flexibility of the composite material of the composite pipe, which reduces the load transfer therebetween. Accordingly, an equivalent rated metallic pipe stub may have a higher safety factor.

Further, the present invention may permit an entire pipe assembly to be provided in which the combined composite pipe and pipe stub define a specific rating, for example associated with pipe assembly diameter.

The pipe assembly may comprise two metallic pipe stubs, one located at each end of the composite pipe. Accordingly, this arrangement may permit opposite ends of the pipe assembly to be secured to appropriate infrastructure.

The composite pipe and metallic pipe stub may define a similar rating, such as a similar pressure rating, structural rating and the like.

The metallic pipe stub may comprise a connector configured to permit connection with external infrastructure. The connector may comprise a flange, such as an API flange, Greylock flange, swivel flange or the like. The connector may comprise a threaded arrangement, such as a tapered threaded arrangement, non-tapered thread arrangement, male thread arrangement, female thread arrangement or the like. The connector may comprise a load shoulder arrangement, such as may be used in a collet type connection, wedge connection or the like. The connector may comprise one or more collet fingers. The connector may comprise a nipple arrangement or the like. The connector may comprise a weld region configured to facilitate welding to external infrastructure. The connector may comprise a gripping face configured to facilitate gripping by external infrastructure, such as gripping by one or more slips. The connector may comprise one or more slips. The connector may comprise a tubing hanger or a portion of a tubing hanger. The connector may comprise a push-fit connector.

The metallic pipe stub may comprise an integrally formed connector.

The metallic pipe stub may be configured to receive or be secured with a separately formed connector, for example via welding, mechanical interlock, interference, threaded arrangement or the like.

The metallic pipe stub may define a receiving region configured to receive a suitable connector. Such an arrangement may permit a connector to be subsequently formed and/or secured on/to the pipe stub. For example, a pipe assembly may be supplied according to the first aspect, and an end user may form or secure a required connector on/to the metallic pipe stub. The receiving region may be provided on an end face of the pipe stub. The receiving region may be provided on an internal and/or external surface of the pipe stub.

The composite pipe may be longer than the pipe stub, for example significantly longer. In such an arrangement a larger proportion of the length of the pipe assembly may be defined by the composite pipe. Accordingly, the structural properties of the composite pipe may dominate the structural properties of the pipe assembly. The composite pipe may be at least twice as long as the pipe stub, at least five times as long as the pipe stub, at least ten times as long as the pipe stub, at least fifty times as long as the pipe stub, for example. Accordingly, the composite pipe may define a larger proportion of the total length of the pipe assembly than the metallic pipe stub. The pipe stub may define a length which is between 1 and 10 times its diameter, for example between 1 and 5 times its diameter. The composite pipe may define a length which is more than 10 times its diameter.

The metallic pipe stub may define an internal diameter which is substantially equivalent to the internal diameter of the composite pipe. Such an arrangement may permit the pipe assembly to define a substantially continuous internal bore diameter along its length. This may facilitate improved internal flow properties, minimise internal restrictions, permit the pipe assembly to be piggable and the like.

The metallic pipe stub and composite pipe may define substantially equal wall thicknesses.

The composite pipe and metallic pipe stub may be secured together in end-to-end relation.

At least a portion of the metallic pipe stub may be received within, or may receive, an end region of the composite pipe.

The metallic pipe stub may be bonded to the composite pipe, for example by chemical bonding, material fusion or the like.

The metallic pipe stub may be mechanically secured to the end region of the composite pipe.

The metallic pipe stub may be mechanically secured to the end region of the composite pipe with preloading therebetween. Such preloading may be provided to accommodate particular service loadings and/or conditions. Such preloading may be provided to accommodate service loads, such as mechanical and pressure loads, during use while minimising possible separation of the composite pipe and pipe stub. More specifically, preloading may permit any seal established between the composite pipe and metallic pipe stub to be maintained, even under service conditions. The metallic pipe stub may be mechanically secured to the end region of the composite pipe with pre-compression therebetween. Such pre-compression may permit axial tensile loading to be accommodated by the pipe assembly during use.

The pipe assembly may comprise a connection assembly for securing the metallic pipe stub to the composite pipe.

At least a portion of the connection assembly may be integrally formed with one of the composite pipe and metallic pipe stub.

At least a portion of the connection assembly may be separately formed from one or both of the composite pipe and metallic pipe stub.

One of the composite pipe and the metallic pipe stub may be integrally formed with a connection assembly, and the other of the composite pipe and metallic pipe stub may be mechanically secured to the connection assembly.

The connection assembly may mechanically secure the pipe stub to the composite pipe.

The connection assembly may establish an axial connection force, such as a axial compressive connection force between the composite pipe and metallic pipe stub. Such an arrangement may permit axial preloading, such as compressive preloading to be established between the composite pipe and metallic pipe stub.

The connection assembly may extend across an interface between the composite pipe and the metallic pipe stub to provide a connection force therebetween, such as an axial connection force, for example a compressive connection force.

The connection assembly may comprise a loading mechanism or arrangement for applying a connection force between the composite pipe and metallic pipe stub. The loading mechanism may comprise a threaded arrangement, tie bolt arrangement, cam arrangement, buckle arrangement or the like.

The connection assembly may be adjustable to provide an adjustable connection force between the composite pipe and the metallic pipe stub. Such an arrangement may permit a desired preload between the composite pipe and metallic pipe stub to be achieved.

One or both of the composite pipe and the metallic pipe stub may comprise or define a load profile configured to be engaged by the connection assembly to permit a connection force to be applied therebetween. In such an arrangement the connection assembly may comprise or define one or more complementary load profiles configured to interengage with a respective load profile on one or both of the composite pipe and metallic pipe stub.

The load profile may comprise a wedge profile. The load profile may comprise a flanged profile. The load profile may comprise a load shoulder.

A load profile may be integrally formed with an associated one of the composite pipe and metallic pipe stub. A load profile may be separately formed and subsequently secured to an associated one of the composite pipe and metallic pipe stub.

Both the composite pipe and the metallic pipe stub may comprise a load profile and the connection assembly may be arranged to apply a connection force between said load profiles. Both the composite pipe and the metallic pipe stub may comprise a load profile of common form, such as both of a wedge form, shoulder form or the like.

Both the composite pipe and the metallic pipe stub may comprise a load profile of differing form.

In one embodiment the composite pipe may define a wedge shaped load profile. The wedge shaped load profile may be formed from a composite material, which may be the same or similar to the composite material of the composite pipe. The wedge shaped profile may be integrally formed with the composite pipe, for example during manufacture of the pipe. The wedge shaped profile may be initially provided as a pre-formed component and subsequently secured to a pre-formed composite pipe, for example by material fusion, such as by melting and solidifying.

The wedge shaped load profile may be provided by an increasing wall thickness of the composite pipe towards an end thereof. Such use of a wedge profile may maximise a load/contact area between the composite pipe and connection assembly, which may facilitate distribution of the connection load throughout the end region of the composite pipe. Such a wedge profile may assist to stabilise poisons ratio and may increase hoop stiffness of the composite pipe at its end region. This may be utilised to achieve desired matching of structural properties of the composite pipe and the connection assembly and/or the metallic pipe stub at the interface therebetween. For example, such a wedge profile may function to reduce differential movement of the composite pipe, the material of which may be more elastic, and the connection assembly, which may be less elastic.

The wedge profile of the composite pipe may comprise a composite material, wherein the composition and geometric arrangement of the composite material, for example the geometry of the reinforcing elements, is selected to provide particular structural properties, such as to more closely match those of the connection assembly and/or the metallic pipe stub in the region of the interface therebetween. For example, specific reinforcing element orientations or wrap angles may be selected to provide particular structural properties and behaviour within the end region of the composite pipe.

The connection assembly may comprise a connector member secured to the composite pipe, with the pipe stub secured to the connector member.

The connection assembly may comprise a sleeve arrangement which extends between the composite pipe and the metallic pipe stub. The sleeve arrangement may comprise or define one or more complimentary load profiles configured to engage a load profile present on the composite pipe and/or metallic pipe stub. The sleeve arrangement may comprise or define opposing load profiles, wherein one load profile is configured to engage a complementary load profile on the composite pipe, and the other load profile is configured to engage a complimentary load profile on the metallic pipe stub.

The sleeve arrangement may comprise a sleeve or collar which extends across the interface between the composite pipe and metallic pipe stub. The sleeve may comprise or define one or more complimentary load profiles configured to engage a load profile present on the composite pipe and/or metallic pipe stub.

The sleeve arrangement may comprise a separate locking structure configured to be engaged with the sleeve, wherein the locking structure defines a load profile configured to engage a load profile on one of the composite pipe and metallic pipe stub. The locking structure may be configured to be threadedly engaged with the sleeve. The locking structure may be configured to be interlocked with the sleeve, for example via a ratchet profile or the like. The locking structure may comprise a locking ring. The locking structure may be circumferentially continuous. This may require the locking structure to be fed on to one end of the composite pipe or pipe stub. The locking structure may be provided in at least two segments or component. Thus arrangement may facilitate mounting and appropriate positioning of the locking structure without requiring feeding from one end of the composite pipe or pipe stub. This may be particularly advantageous in conditions which do not permit such a locking structure to be fed from one end of the composite pipe or pipe stub, for example as might be the case in off-shore applications, such as in subsea oil and gas applications.

In one embodiment the sleeve may define a load profile configured to engage a complementary load profile on one of the composite pipe and metallic pipe stub, and the locking structure may define a load profile configured to engage a complementary load profile on the other of the composite pipe and metallic pipe stub. In such an arrangement, engagement or interlocking, such as threaded engagement, between the sleeve and locking structure may establish a connection force between the respective load profiles, and thus between the composite pipe and metallic pipe stub.

The sleeve arrangement may comprise two locking structures configured to be engaged with opposing ends of the sleeve, wherein each locking structure defines a load profile configured to engage respective and complementary load profiles on the composite pipe and the metallic pipe stub. In such an arrangement, engagement or interlocking between the locking structures and the sleeve may establish a connection force between the respective load profiles, and thus between the composite pipe and metallic pipe stub.

The sleeve may define a region of relief at a portion which engages or is in proximity to the composite pipe. Such a region of relief may provide a region of structural relief. Such an arrangement may function to minimise local loading on the composite pipe during bending motion. The region of relief may be provided by a region of material removal, region of reduced wall thickness, a channel, slot, detent, recess or the like. Multiple regions of relief may be provided. The region of relief may be provided in proximity to an end region of the sleeve.

The connection assembly may comprise a buckle arrangement, such as an over-centre lever buckle arrangement.

The connection assembly may be configured to be energised or made-up by use of a tool, such as a hydraulic tool. The connection assembly may define appropriate engagement profiles to permit engagement with a tool, and allow transfer or a make-up force from the tool into the connection assembly.

The composite material of the composite pipe may function to isolate or at least partially isolate the connection assembly from thermal effects of any medium being communicated through the pipe assembly. This may assist to minimise thermal loadings experienced by the connection assembly, and thus possible differential expansion and contraction between the connection assembly and the composite pipe. The connection assembly may be of metal construction, or at least part metal construction.

The pipe assembly may comprise an electrical insulation arrangement between the composite pipe and connection assembly. Such an arrangement may function to minimise potential corrosion within the pipe assembly, for example within the connection assembly. At least a portion of the electrical insulation arrangement may be integrally formed with the composite pipe, for example integrally formed with a load profile of the composite pipe. In one embodiment the composite pipe may comprise a dielectric material in a surface region thereof which in use is engaged with the connection assembly. The dielectric material may comprise or define part of the composite material of the composite pipe. The dielectric material may be defined by a composite material comprising a dielectric matrix and dielectric reinforcing elements embedded therein. The dielectric material may be integrally formed with the matrix of the composite pipe. For example, the dielectric material may define a portion of the matrix of the pipe. The dielectric material may be free from reinforcing elements. The dielectric material may comprise E-glass, for example E-glass reinforcing elements, PEEK or the like, or any suitable combination.

At least a portion of the electrical insulation arrangement may be separately formed and interposed between the composite pipe and the connection assembly.

In some embodiments an end region of the composite pipe may directly engage the metallic pipe stub. In other embodiments the end regions of the composite pipe and metallic pipe stub may be isolated from each other. Such isolation may be provided to establish electrical isolation therebetween, thermal isolation therebetween or the like. Such isolation may be provided to protect one or both of the composite pipe and metallic pipe stub from particular mechanical loading, such as uneven loading.

The pipe assembly may comprise an engagement member interposed between the end regions of the composite pipe and the metallic pipe stub. The engagement member may be clamped between the composite pipe and the metallic pipe stub when a connection load is applied therebetween.

The engagement member may function as a seal.

The engagement member may function to protect one or both of the composite pipe and metallic pipe stub from particular mechanical loading, such as uneven loading.

At least part of the engagement member may comprise a composite material formed of at least a matrix and one or more reinforcing elements embedded within the matrix. The construction of the composite material of the engagement member may be configured to permit the engagement member to preferentially deform to accommodate the end region of the composite pipe. Such an arrangement may function to protect the end of at least the composite pipe from damage when exposed to connection and other loads, such as operational loads.

Without wishing to be bound by theory, it is believed that a cause of failure in composite pipe ends may result from the inability of substantially axial reinforcing elements, e.g. fibres, at or near the end region of the pipe to locally deform to accommodate high local loads typically associated with regions of connection, which may be exacerbated by irregularities on or near the end surface of the pipe. This can result in significant load variations on or near the end surface of the pipe. A small area of the end surface and/or a limited number of substantially axial fibres of the pipe may locally bear high axial loading, causing local failure of the fibres of the composite material subjected to high axial loading. High axial loading may then be transferred to another small area of the end surface and/or a limited number of substantially axial fibres of the pipe end, which may result in cascading failure of small areas of the end surface and/or a limited number of substantially axial fibres of the pipe end.

The construction of the composite material of the engagement member may act to spread axial loading on the end region of the pipe over the end surface of the pipe engaged with, e.g. in contact or abutment with, the engagement member, thereby reducing the risk of failure of the pipe end.

The engagement member may be provided in accordance with that disclosed in applicant's co-pending application no. PCT/GB2012/000027, the disclosure of which is incorporated herein by reference.

The engagement member may be configured to contact or abut, e.g. sealably contact or abut, the end regions of the composite pipe and metallic pipe stub.

The engagement member may be configured to accommodate surface irregularities of the end region of at least the composite pipe.

The engagement member may be configured to accommodate preferential load distribution, such as uniform load distribution, e.g. within the end portion of at least the composite pipe.

The engagement member may comprise or define a first side substantially facing the end region of the composite pipe, and a second side substantially facing the metallic pipe stub.

The engagement member may be fixed to one or both of the composite pipe and the metallic pipe stub. The engagement member may be fixed to the composite pipe. The engagement member may be fixed to one or both of the composite pipe and metallic pipe stub by, for example, welding, fusing by melting and solidifying, mechanical connection, adhesive bonding or the like.

The construction of the composite material of the engagement member may be configured such that at least some of the reinforcing elements, e.g. fibres, of the composite material of the engagement member may be predominantly oriented in a direction substantially transverse, e.g. substantially orthogonal, to an axis, e.g. a longitudinal axis, of the composite pipe, e.g. to a direction of the irregularities of the end face or end surface of the pipe. By such provision the construction of the composite material of the engagement member may be configured to preferentially deform to accommodate or comply with the pipe, particularly irregularities of the pipe. In such an arrangement the matrix between the reinforcing elements may be deformed upon engagement, e.g. contact, between the engagement member and the end of the composite pipe and/or metallic pipe stub.

At least some of the reinforcing elements within the engagement member may move, e.g. may deform, bend or splay within the matrix, e.g. relative to each other and/or relative to the matrix, upon engagement with the composite pipe end and/or metallic pipe stub. At least some of the reinforcing elements may move, e.g. may deform, bend or splay, preferentially transversely, e.g. orthogonally, upon engagement with the composite pipe, e.g. in a plane substantially transverse to an axis, e.g. to a longitudinal axis, of the composite pipe. The matrix material may also deform and/or comply to accommodate the end region of the composite pipe.

At least some of the reinforcing elements, e.g., fibres, of the composite material of the engagement member may be provided in a random manner within the matrix material. For example, the reinforcing elements may comprise chopped fibres mixed within the matrix material. Such an arrangement may permit the matrix material to deform, and any affected reinforcing elements to be splayed or displaced, upon engagement with the composite pipe end region, thus permitting said region to be accommodated.

At least some of the reinforcing elements, e.g., fibres, of the composite material of the engagement member may be provided in an ordered manner with a global or predominant direction of alignment within the matrix material. The ordered direction may be selected to permit the matrix material to deform, and any affected reinforcing elements to be splayed or displaced, upon engagement with the composite pipe end region, thus permitting said region to be accommodated.

At least some of the reinforcing elements, e.g. fibres, of the composite material of the engagement member may be predominantly oriented in a direction such that the engagement member, e.g. matrix thereof, may be capable of accommodating and/or sealably contacting or abutting the end region of the composite pipe and/or end region of the metallic pipe stub, and/or of substantially evenly applying compressive loads on the end face or end surface of end region of the composite pipe and/or end region of the metallic pipe stub, without causing damage to the end region of the pipe and/or end region of the pipe stub.

The composite pipe may comprise a bore sealing assembly configured to provide sealing within the bore of the pipe assembly at the interface between the composite pipe and the metallic pipe stub.

The bore sealing assembly may comprise a sealing sleeve structure which is mounted at an interface region between the composite pipe and the metallic pipe stub. A sealing sleeve may be mounted internally of the pipe assembly. A sealing sleeve may be mounted externally of the pipe assembly.

The sealing sleeve may be mounted internally within the pipe assembly and within a circumferential recess. Such an arrangement may permit a uniform internal diameter of the pipe assembly to be achieved.

The sealing sleeve may extend across an interface between the composite pipe and the metallic pie stub. In such an arrangement the sealing sleeve may sealingly engage both the composite pipe and the metallic pipe stub.

The sealing sleeve may extend across an interface between one of the composite pipe and metallic pipe stub and an engagement member which is interposed between the composite pipe and metallic pipe stub. In one embodiment the sealing sleeve may extend across an interface between the metallic pipe stub and an engagement member. Also, in one embodiment the sealing sleeve may not extend across an interface between the composite pipe and the engagement member. In such an arrangement the composite pipe may not require a recess or any modification to accommodate a sealing sleeve, thus assisting to simplify the manufacture of the composite pipe, and possibly avoiding any structural issues which may be caused by the provision of a recess in the composite pipe.

An engagement member interposed between the composite pipe and the metallic pipe stub may define a recess configured to accommodate a sealing sleeve.

The composite pipe may define an extended region of increased wall thickness in an end region thereof. Such an increased wall thickness may be increased relative to the remaining portion of the composite pipe. The extended region may extend beyond any connection assembly. The extended region of increased wall thickness may function to provide improved mechanical properties of the composite pipe in the region where load is expected to be greatest. The extended region of increased thickness may be configured to define an integral stiffener, such as an integral bend stiffener.

The increased wall thickness may be defined by an increasing wall thickness towards an end region of the composite pipe. Such an increasing wall thickness may be defined by a tapering profile, for example an external tapering profile.

The extended region of increase wall thickness may extend at least 1 m along the end region of the composite pipe, at least 3 m along the end region of the composite pipe, at least 5 m along the end region of the pipe, at least 10 m along the end region of the composite pipe, for example.

The extended region of wall thickness may be integrally formed with the composite pipe during manufacture, for example formed by appropriate manipulation or lay-up of the composite material of the composite pipe.

The matrix may comprise a polymer material.

The matrix may comprise a thermoplastic material.

The matrix may comprise a thermoset material.

The matrix may comprise a polyaryl ether ketone, a polyaryl ketone, a polyether ketone (PEK), a polyether ether ketone (PEEK), a polycarbonate or the like, or any suitable combination thereof. The matrix may comprise a polymeric resin, such as an epoxy resin or the like.

The reinforcing elements may comprise continuous or elongate elements. The reinforcing elements may comprise any one or combination of polymeric fibres, for example aramid fibres, or non-polymeric fibres, for example carbon, glass or basalt elements or the like. The reinforcing elements may comprise fibres, strands, filaments, nanotubes or the like. The reinforcing elements may comprise discontinuous elements.

The matrix and the reinforcing elements may comprise similar or identical materials. For example, the reinforcing elements may comprise the same material as the matrix, albeit in a fibrous, drawn, elongate form or the like.

The pipe assembly may be configured for use in the transportation of hydrocarbons, or fluids associated with the exploration and production of hydrocarbons, such as water, drilling mud, purge fluid, chemicals such as acids, fracturing fluid and the like.

The pipe assembly may define a flow-line, jumper, conduit, riser member or the like.

According to a second aspect of the present invention there is provided a method for connecting a pipe assembly to infrastructure, comprising:

securing a metallic pipe stub to an end region of a composite pipe, wherein the composite pipe comprises a composite material formed of at least a matrix and a plurality of reinforcing elements embedded within the matrix;

providing a connector on the metallic pipe stub;

connecting the pipe assembly to infrastructure via the connector on the metallic pipe stub.

The method may comprise providing a metallic pipe stub which includes a preformed connector.

The method may comprise first securing the metallic pipe stub to the composite pipe, and then securing a separately formed connector to the metallic pipe stub.

According to a third aspect of the present invention there is provided a method of forming a pipe assembly to be connected to infrastructure, comprising:

securing a metallic pipe stub to an end region of a composite pipe, wherein the composite pipe comprises a composite material formed of at least a matrix and a plurality of reinforcing elements embedded within the matrix;

providing a connector on the metallic pipe stub which is configured for use on connecting the pipe assembly to infrastructure.

The method may comprise providing a metallic pipe stub which includes a preformed connector.

The method may comprise first securing the metallic pipe stub to the composite pipe, and then securing a separately formed connector to the metallic pipe stub.

The method according to the second and/or third aspects may comprise use of the pipe assembly according to the first aspect and as such features defined in relation to the first aspect may apply to the method according to the second and/or third aspects.

According to a fourth aspect of the present invention there is provided a pipe assembly, comprising:

a composite pipe comprising a composite material formed of at least a matrix material and a plurality of reinforcing fibres embedded within the matrix material;

a connector member secured to an end region of the composite pipe and defining a connection structure to permit connection of an object to the pipe assembly; and a load arrangement configured to retain a compressive load between the composite pipe and the connector member.

Accordingly, in the pipe assembly of this fourth aspect the connector member is secured to the composite pipe with compressive loading retained therebetween by the load arrangement. As such loading is retained within the pipe structure before any connection is made with an object, this loading may be considered to be a preloading. Such preloading may be provided to accommodate particular service loadings and/or conditions. Such preloading may be provided to accommodate service loads, such as mechanical and pressure loads, during use while minimising possible separation of the composite pipe and connector member. More specifically, preloading may permit any seal established between the composite pipe and connector member to be maintained, even under service conditions.

The load arrangement may be configured to provide the compressive load between the connector member and the composite pipe. Alternatively, a compressive load may be applied through a separate apparatus, and this load then retained by the load arrangement.

The connector member may comprise or be formed by a metallic material, such as steel.

The connector member may comprise a pipe stub. The pipe stub may be configured to support a connector to permit the pipe assembly to be secured to a separate object or infrastructure. The pipe stub may be shorter than the composite pipe.

The connection structure of the connector member may comprise a thread configured to permit an object to be threadedly coupled to the pipe assembly. The thread may include an internal thread. The thread may include an external thread.

The connection structure of the connector member may comprise a connection profile to be engaged by a corresponding profile on an object to be connected to the pipe assembly.

The connection member may permit a further pipe to be coupled thereto.

The connector member may comprise a sleeve which includes the connection profile.

The load arrangement may comprise a sleeve, such as a threaded sleeve configured to engage the connector member.

The pipe assembly may comprise a connection assembly for securing the connector member to the composite pipe.

At least a portion of the connection assembly may be integrally formed with one of the composite pipe and connector member.

At least a portion of the connection assembly may be separately formed from one or both of the composite pipe and connector member.

One of the composite pipe and connector member may be integrally formed with a connection assembly, and the other of the composite pipe and connector member may be mechanically secured to the connection assembly.

The connection assembly may mechanically secure the connector member to the composite pipe.

The load arrangement may form part of the connection assembly.

The connection assembly may extend across an interface between the composite pipe and the connector member to provide a connection force therebetween.

One or both of the composite pipe and the connector member may comprise or define a load profile configured to be engaged by the connection assembly to permit a connection force to be applied therebetween. In such an arrangement the connection assembly may comprise or define one or more complementary load profiles configured to interengage with a respective load profile on one or both of the composite pipe and connector member.

The load profile may comprise a wedge profile. The load profile may comprise a flanged profile. The load profile may comprise a load shoulder.

A load profile may be integrally formed with an associated one of the composite pipe and connector member. A load profile may be separately formed and subsequently secured to an associated one of the composite pipe and connector member.

Both the composite pipe and the connector member may comprise a load profile and the connection assembly may be arranged to apply a connection force between said load profiles. Both the composite pipe and the connector member may comprise a load profile of common form, such as both of a wedge form, shoulder form or the like.

Both the composite pipe and the connector member may comprise a load profile of differing form.

In one embodiment the composite pipe may define a wedge shaped load profile. The wedge shaped load profile may be formed from a composite material, which may be the same or similar to the composite material of the composite pipe. The wedge shaped profile may be integrally formed with the composite pipe, for example during manufacture of the pipe. The wedge shaped profile may be initially provided as a pre-formed component and subsequently secured to a pre-formed composite pipe, for example by material fusion, such as by melting and solidifying.

The wedge shaped load profile may be provided by an increasing wall thickness of the composite pipe towards an end thereof. Such use of a wedge profile may maximise a load/contact area between the composite pipe and connection assembly, which may facilitate distribution of the connection load throughout the end region of the composite pipe. Such a wedge profile may assist to stabilise poisons ratio and may increase hoop stiffness of the composite pipe at its end region.

The wedge profile of the composite pipe may comprise a composite material, wherein the composition and geometric arrangement of the composite material, for example the geometry of the reinforcing elements, is selected to provide particular structural properties, such as to more closely match those of the connection assembly and/or the connector member in the region of the interface therebetween. For example, specific reinforcing element orientations or wrap angles may be selected to provide particular structural properties and behaviour within the end region of the composite pipe.

The connection assembly may comprise a sleeve arrangement which extends between the composite pipe and the connector member. The connector member may be located within this sleeve arrangement. The load arrangement may be secured, for example adjustably secured, relative to the sleeve arrangement to act on the connector member and retain compression between said connector member and the composite pipe.

The sleeve arrangement may comprise a sleeve or collar which extends across the interface between the composite pipe and the connector member. The sleeve may comprise or define one or more complimentary load profiles configured to engage a load profile present on the composite pipe and/or connector member.

The load arrangement may be threadedly engaged with the sleeve. The load arrangement may be configured to be interlocked with the sleeve, for example via a ratchet profile or the like. The load arrangement may comprise a locking ring. The load arrangement may be circumferentially continuous. The load arrangement may be provided in at least two segments or component.

In one embodiment the sleeve may define a load profile configured to engage a complementary load profile on one of the composite pipe and connector member, and the load arrangement may define a load profile configured to engage a complementary load profile on the other of the composite pipe and connector member. In such an arrangement, engagement or interlocking, such as threaded engagement, between the sleeve and load arrangement may establish a connection force between the respective load profiles, and thus between the composite pipe and connector member.

The sleeve may define a region of relief at a portion which engages or is in proximity to the composite pipe. Such a region of relief may provide a region of structural relief. Such an arrangement may function to minimise local loading on the composite pipe during bending motion. The region of relief may be provided by a region of material removal, region of reduced wall thickness, a channel, slot, detent, recess or the like. Multiple regions of relief may be provided. The region of relief may be provided in proximity to an end region of the sleeve.

In some embodiments the connector member defined according to the fourth aspect may be provided by a pipe stub as defined in relation to the first aspect.

According to a fifth aspect of the present invention there is provided a method for connecting a pipe assembly to an object, comprising:

securing a connector member which includes a connection structure to an end region of a composite pipe, wherein the composite pipe comprises a composite material formed of at least a matrix and a plurality of reinforcing elements embedded within the matrix;

retaining a compressive load between the composite pipe and the connector member by a load arrangement; and connecting the pipe assembly to an object via the connection structure on the connector member. It should be understood that features defined in relation to one aspect may be provided in combination with any other aspect.

BRIEF DESCRIPTION OF THE DRAWINGS

These and other aspects of the present invention will now be described, by way of example only, with reference to the accompanying drawings, in which.

DETAILED DESCRIPTION OF THE DRAWINGS

Figure 1:
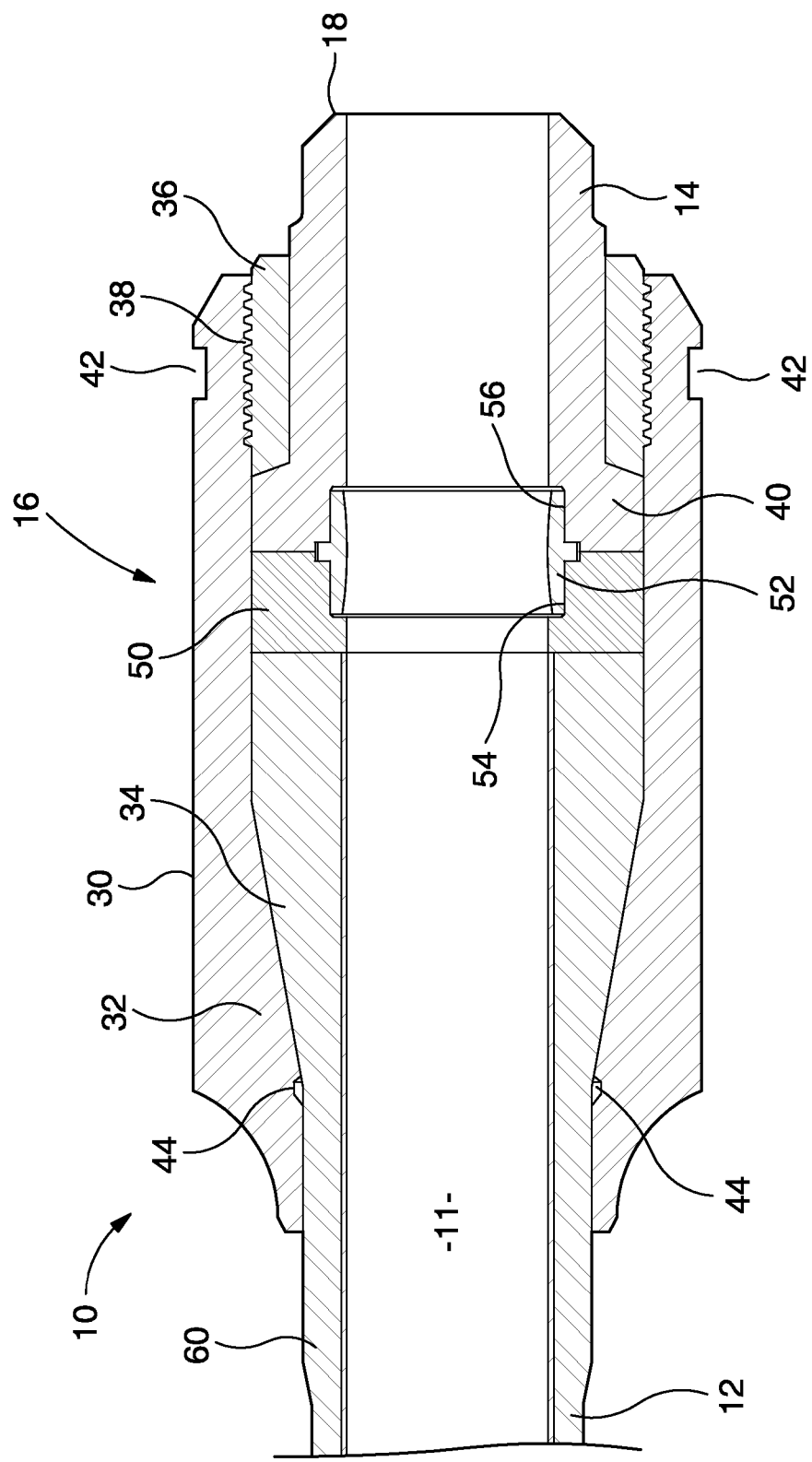
FIG. 1 is a cross-sectional view of an end region of a pipe assembly according to an embodiment of the present invention.

A cross-sectional view of an end region of a pipe assembly according to an embodiment of the present invention is illustrated in FIG. 1. The pipe assembly, generally identified by reference numeral 10, defines an internal flow path 11 and may be for use in numerous applications, such as for use in the conveyance of fluids and/or equipment associated with the exploration and production of hydrocarbons. For example, the pipe assembly 10 may be for use as a flow line for hydrocarbons or the like. As illustrated in FIG. 1, the internal flow path 11 defines a substantially uniform diameter such that internal restrictions are minimised. This may provide a number of advantages, such as preventing undesired flow profiles, avoiding internal restrictions, allowing pigging operations to be performed and the like.

The pipe assembly 10 includes a composite pipe 12 comprising a composite material formed from at least a matrix and a plurality of reinforcing fibres embedded within the matrix (the matrix and reinforcing elements are not individually illustrated). Although any suitable composite material may be utilised, in the present embodiment the matrix may comprise a PEEK material and the reinforcing elements may comprise carbon fibre. Furthermore, the arrangement of the carbon fibres within the matrix may be provided in any suitable form, which may be dictated by operational duty requirements, such as internal and external pressures, mechanical loading such as axial loading, bending and the like. In one embodiment the reinforcing elements may comprise elongated fibres which are laid in appropriate wrap angles relative to a central axis of the composite pipe 12.

The pipe assembly 10 further comprises a metallic pipe stub 14 which is significantly shorter than the composite pipe 12 and is secured to an end of the composite pipe 12 via a connection assembly 16 (described later below). The metallic pipe stub 14 may be formed of any suitable metallic material. However, in the present embodiment the pipe stub 14 may be of steel construction. Further, in the present embodiment the metallic pipe stub 14 is of the same rating as the composite pipe 12.

In the present embodiment the pipe stub 14 includes a free end region 18 to which a connector may be secured and which may be used to connect the entire pipe assembly 10 to separate infrastructure, such as a manifold, another pipe or pipe assembly, a flange or the like. As such, in the present embodiment, although the composite pipe 12 defines the greatest proportion of the length of the pipe assembly 10, and as such incorporates significant advantages associated with composite materials, a suitable connector for the pipe assembly 10 is defined on the metallic pipe stub component 14. This arrangement may eliminate any problems associated with directly providing a connector on a composite pipe. Further, this arrangement may permit use of conventional connection arrangements which are typically associated with metallic pipe structures and which are proven and accepted in industry (the oil and gas industry in the present exemplary embodiment).

Furthermore, the particular combination of the composite pipe 12 and connected metallic pipe stub 14 for facilitating connection with separate infrastructure may be such that the pipe stub 14, and any connector or infrastructure secured thereto, is subjected to far lower loads than if it were part of an all steel structure by virtue of the relative flexibility of the composite material of the composite pipe 12, which reduces the load transfer therebetween. Accordingly, an equivalent rated metallic pipe stub 14 and/or connector secured thereto may have a higher safety factor.

As noted above, the free end 18 of the pipe stub 14 may receive and support a suitable connector. Such an arrangement may permit a user to take delivery of or form the pipe assembly 10, and then apply or secure a desired connector to the end 18 of the pipe stub 14, maintaining a level of design freedom for the user, which may be difficult to provide with an all-composite structure.

Figure 3:
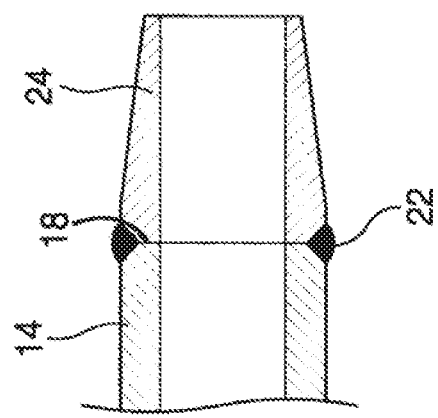
FIGS. 2 and 3 are diagrammatic sectional views of an end region of the pipe assembly shown in FIG. 1, illustrating attached connectors according to alternative embodiments of the present invention.
Figure 2:
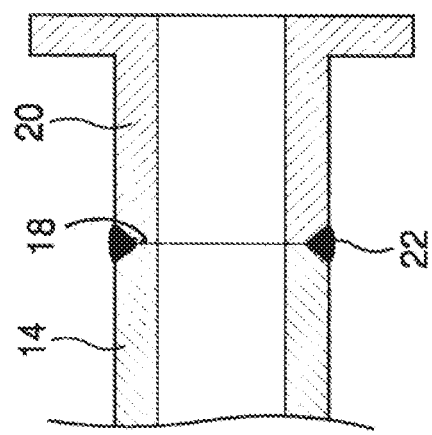

It will be recognised that many different forms of connector may be secured to the end 18 of the pipe stub 14. In one exemplary embodiment, illustrated in FIG. 2, a flange connector 20 may be secured to the end 18 of the pipe stub 14 via a weld 22. In a further embodiment illustrated in FIG. 3 a male threaded connector 24, such as a threaded pin connector, may be welded to the end 18 of the pipe stub 14 via weld bead 22. Of course these specific examples are merely exemplary, and it should be understood that other types of connectors may be utilised, such as collet type connectors, stab-in type connectors, API flanges, Greylock flanges, swivel flanges, female threaded connectors and the like.

Figure 4:
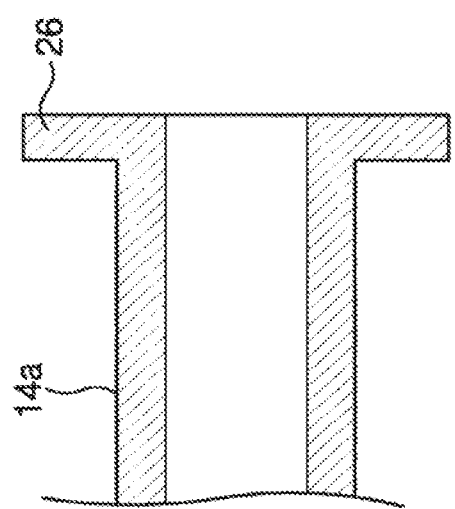
FIG. 4 is a diagrammatic sectional view of an end region of the pipe assembly, illustrating an integrally formed connector according to an alternative embodiment of the present invention.

As noted above, in the specific embodiment illustrated in FIG. 1 a user may be free to secure a desired connector to the end 18 of the pipe stub 14. However, in an alternative embodiment the pipe stub 14 may be provided with an integrally formed connector, for example integrally cast, machined or the like. Such an exemplary embodiment is illustrated in FIG. 4 in which a pipe stub, in this case illustrated by reference numeral 14a, includes an integrally formed flange 26.

Referring again to FIG. 1, the connection arrangement 16 which secures the pipe stub 14 to the composite pipe 12 includes a sleeve 30 which spans across the interface between the end regions of the pipe 12 and pipe stub 14. In the present embodiment the sleeve 30 is of metallic construction, for example steel, although other materials may be utilised to form the sleeve 30, such as composite materials. The sleeve 30 defines a wedge shaped load profile 32 at one end thereof which in use engages a complementary wedge shaped load profile 34 formed on the composite pipe 12.

The connection arrangement 16 further comprises a locking ring 36 which threadedly engages an opposite end of the sleeve 30 from its wedge profile 32 via interengaging threads 38. In the present embodiment the locking ring 36 is of metallic construction, for example steel, although other materials may be utilised. In use the locking ring 36 engages a load profile 40, provided in the form of an upset region or hub, formed on the pipe stub 14. Accordingly, when the connection is made-up, the ends of the pipe 12 and pipe stub 14, and specifically the wedge profile 34 and upset region 40, become captivated between the sleeve 30 and locking ring 36 to provide a connection therebetween.

The sleeve 30 comprises a number of keys 42 (two illustrated in FIG. 1) which facilitate engagement with a make-up tool (not shown) which may effect relative rotation of the locking ring 36 and sleeve 30. The locking ring 36 may be tightened via the interengaging threads 38 to press against the hub 40 of the pipe stub 14, thus pressing the composite pipe 12 and the pipe stub 14 together. The particular pressing force established by the sleeve 30 and locking ring 36 may establish a level of preloading, specifically pre-compression between the pipe 12 and pipe stub 14. This preloading may minimise the risk of separation of the pipe 12 and pipe stub 14 when in use and under load, such as from structural loads, pressure loads, cyclical loads, thermal loads and the like. That is, the pre-compression may permit any sealing between the pipe 12 and pipe stub 14 to be maintained during service conditions. In some embodiments a compressive load may be provided between the composite pipe 12 and pipe stub 14 via a separate apparatus, and the locking ring then tightened to retain this applied compressive force.

The sleeve 30 includes regions of relief 44 which assist to minimise the local loading on the composite pipe 12 when in use, such as bending loads and the like.

The wedge shaped load profile 34 in the present embodiment is integrally formed within the composite pipe 12, and comprises the same composite material as the pipe 12. The provision of this wedge profile 34 of course facilitates load transfer with the connection assembly 16 as noted above. However, this wedge profile 34 also functions to assist to stabilise poisons ratio and increase hoop stiffness of the composite pipe at its end region. This may function to reduce differential movement of the composite pipe 12, the material of which is more elastic, and the connection assembly 16, which is less elastic.

The pipe assembly 10 further comprises an engagement member 50 which is interposed between the ends of the pipe 12 and pipe stub 14. In the specific embodiment shown the engagement member 50 is generally ring shaped and is formed of a composite material of a matrix (specifically PEEK) and a plurality of reinforcing members (specifically carbon fibres) embedded within the matrix. Furthermore, the engagement member 50 is initially secured to the end of the composite pipe, for example by material fusion, bonding or the like.

The engagement member 50 may function to preferentially deform to accommodate and assist to protect the end region of at least the composite pipe 12. That is, the engagement member 50 may preferentially deform to more evenly distribute applied loads across the end face of the composite pipe 12, which may otherwise be at risk of failure where uneven loading is applied to the composite structure.

In the present embodiment, the fibres of the composite material of the engagement member 50 are predominantly oriented in a substantially circumferential direction, and irregularities of the end region of the pipe 12 may extend in a substantially axial direction. By such provision, the engagement member 50 may act to spread the axial compressive load on the end region of the pipe 12 over most or substantially all of the end surface of the pipe 12 engaged with the engagement member 50, thereby reducing the risk of failure of the pipe end.

Such configuration allows the irregularities in the end of the pipe 12 to "fit" or be accommodated between the lengths of fibres running predominantly in a substantially transverse, e.g. substantially perpendicular direction, due to the resilient nature of the matrix. Thus, the fibres of the composite material of the engagement member 50 may be allowed or forced to splay upon engagement with the end region of the pipe 12, e.g. deform, bend or move within the matrix. By such provision, exertion of substantial compressive loads upon the reinforcing fibres in an axial direction relative to the fibre orientation may be avoided or at least reduced, thus reducing potential damage to the connected parts.

The pipe assembly 10 further comprises a bore seal in the form of a sealing sleeve 52 which spans the interface between the engagement member 50 and the end of the pipe stub 14. Such an arrangement is particularly advantageous in that the bore sealing is provided remotely from any connection assembly 16, which may assist to provide a simplified structure. As illustrated in FIG. 1, both the engagement member 50 and pipe stub 14 include respective circumferential recesses 54, 56 which accommodate the sealing sleeve 52, permitting a substantially uniform flow path 11 to be maintained.

The composite pipe 12 defines an extended region of increased wall thickness 60 which extends beyond the connection assembly 16. This extended region of increased wall thickness 60 may function to provide improved mechanical properties of the composite pipe 12 in the region where load is expected to be greatest, i.e., leading into the connection assembly 16. The extended region of increased thickness 60 may be configured to define an integral stiffener, such as an integral bend stiffener.

The increased wall thickness 60 in the present embodiment is defined by an increasing wall thickness towards an end region of the composite pipe 12 so as to define an external tapering profile.

The extended region of increased wall thickness 60 may extend at least 1 m along the end region of the composite pipe, at least 3 m along the end region of the composite pipe, at least 5 m along the end region of the pipe, or at least 10 m along the end region of the composite pipe, for example.

Figure 5:
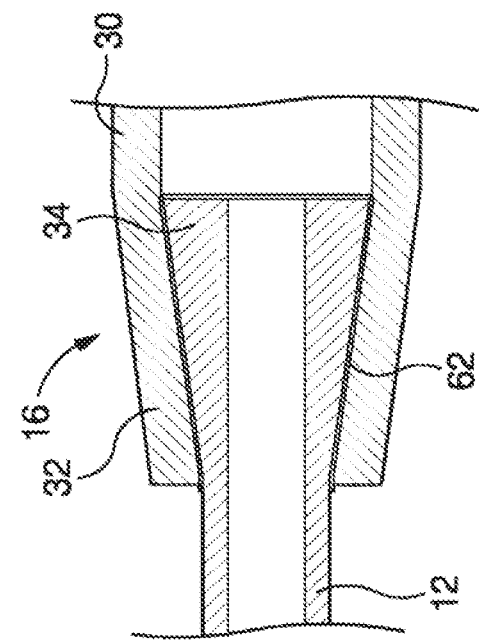
FIG. 5 is a diagrammatic sectional view of a portion of the pipe assembly of FIG. 1.

In the embodiment described above the sleeve 30 of the connection assembly 16 includes a wedge profile 32 which engages the wedge profile 34 formed on the end of the composite pipe 12. In some instances the specific materials used in the construction of the composite pipe 12 may facilitate electrical conduction between the pipe 12 and connection assembly 16. For example, in the specific embodiment described above carbon fibres are provided in the composite pipe 12. Maintaining a path of electrical conduction between the pipe 12 and connection assembly 16 in some cases may be acceptable. However, in other cases this conduction path may not be desired. In one modified embodiment, illustrated in FIG. 5, an electrical insulation material 62 is provided at the interface between the pipe 12 and connection assembly 16. More specifically, in the embodiment shown in FIG. 5, the composite material in the region of the outer surface of the wedge profile 34 is configured to include both dielectric matrix and reinforcing elements, such as a PEEK matrix and E-glass reinforcing elements. However, in other embodiments a layer of pure PEEK (i.e., free from any reinforcing elements) may be provided at the surface region of the wedge profile 34. In another embodiment, the construction of the wedge profile 34 may be such that the surface region thereof is maintained free from carbon fibres or other electrically conducting material.

Providing electrical insulation between the composite pipe 12 and connection assembly 16 may assist to minimise corrosion.

In the embodiment illustrated in FIG. 1 the connection assembly 16 includes a sleeve 30 with an integrated wedge shaped load profile 32. This arrangement may be suitable for use where the sleeve 30 can be mounted on the composite pipe 12 from an opposite (non-illustrated) end, or where the wedge profile 34 of the composite pipe is formed after the sleeve 30 is mounted on the pipe. However, in some occasions neither of the above mounting procedures may be possible, such as may be the case in areas with restricted access, such as in an offshore environment. In view of this a modified embodiment of the present invention may be provided, an example of which is illustrated in FIG. 6, reference to which is now made.

In this embodiment the pipe assembly is generally similar to that shown in FIG. 1, and as such like features share like reference numerals, incremented by 100. As such, the pipe assembly 110 includes a composite pipe 112 and a metallic pipe stub 114 connected thereto via a connection assembly 116. The pipe 112 includes a wedge load profile 134 and the pipe stub 114 includes a hub load profile 140 to facilitate connection via the connection assembly 116. The connection assembly 116 includes a sleeve 130 and a first locking ring 136 which are threadedly engaged such that the first locking ring 136 may press against the hub 140 of the pipe stub 114. Further, the connection assembly also includes an opposite second locking ring 132 which is threadedly engaged with the sleeve 130. The second locking ring defines a wedge profile which in use engages the wedge profile 134 formed on the composite pipe 112. Accordingly, in use, both the first and second locking rings 136, 132 may be rotated relative to the sleeve 130 to provide a connection force between the pipe 112 and pipe stub 114.

Figure 6:
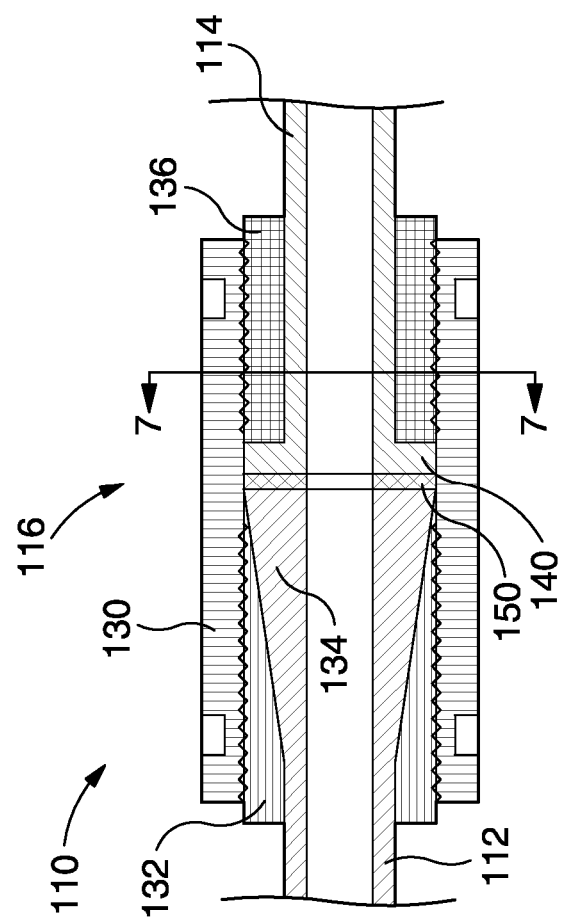
FIG. 6 is a diagrammatic sectional view of an end region of a pipe assembly according to another embodiment of the present invention.
Figure 7:
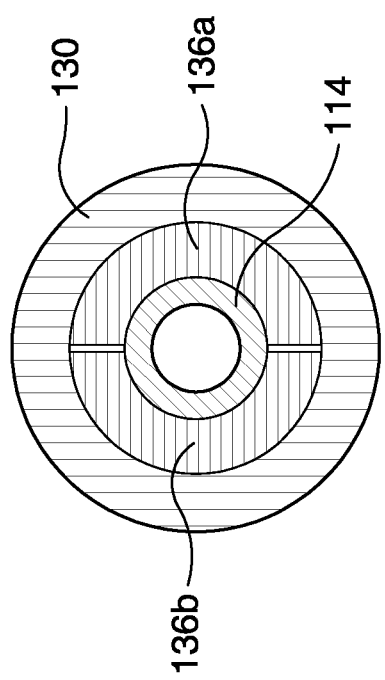
FIG. 7 is a diagrammatic section view of the pipe assembly taken through line 7-7 of FIG. 6.

To enable the connection assembly 116 to receive and connect the ends of the pipe 112 and pipe stub 114, the locking rings 136, 132 are segmented, as illustrated in FIG. 7 which is a sectional view taken through line 7-7 in FIG. 6. It should be noted that although the segmented form of only the first locking ring 136 is illustrated in FIG. 7, the second locking ring 132 is of similar segmented construction. In the present illustrated embodiment the locking ring 136 is composed of two segments 136a, 136b.

Accordingly, in use, the ends of the pipe 112 and pipe stub 114 may be inserted into the sleeve 130, with an engagement member 150 positioned therebetween. A bore seal may also be provided but is not illustrated for clarity. Following this the segmented locking rings 132, 136 may be mounted over the pipe 112 and pipe stub 114, respectively, and threadedly engaged with the sleeve 130 to a desired torque to establish a connection force between the pipe 112 and pipe stub 114.

Figure 8:
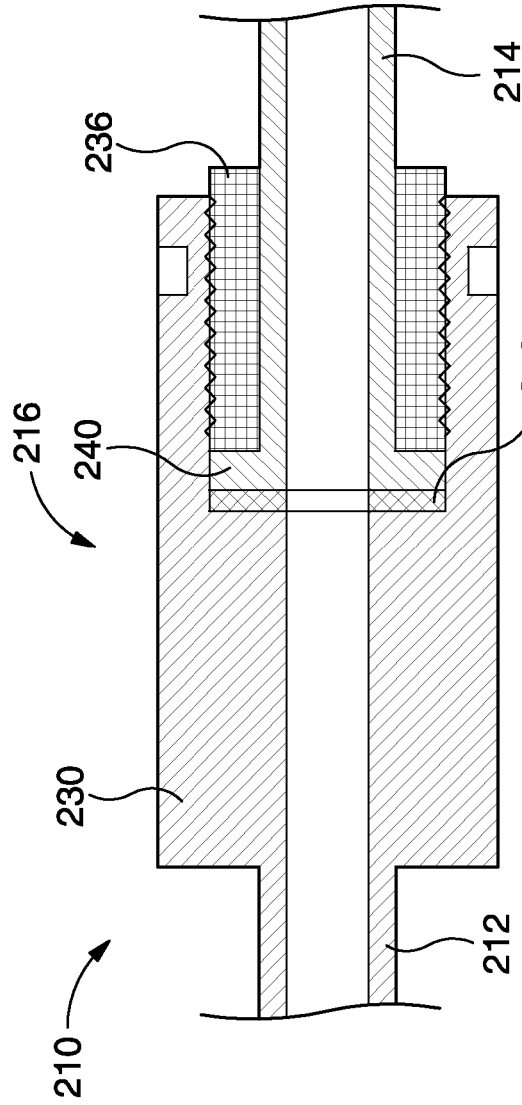
FIG. 8 is a diagrammatic sectional view of an end region of a pipe assembly according to a further embodiment of the present invention.

In the embodiments described above the connection assembly is provided entirely separately from both the composite pipe and metallic pipe stub. However, in some embodiments at least a portion of the connection assembly may be integrally formed with one or both of the pipe and pipe stub. Such an exemplary embodiment is illustrated in FIG. 8, reference to which is now made. It should be understood that the arrangement in FIG. 8 is largely similar to that shown in FIG. 1 and as such like components share like reference numerals, incremented by 200.

Thus, the pipe assembly, generally identified by reference numeral 210, includes a composite pipe 212 and a metallic pipe stub 214 connected thereto via a connection assembly 216. The connection assembly includes a sleeve 230 which is integrally formed with an end of the composite pipe 212. The connection assembly 216 further includes a locking ring 236 which is threadedly engaged with the sleeve 230 and in use engages a hub portion 240 of the pipe stub 214 to secure the pipe stub 214 to the composite pipe 212. As illustrated, an engagement member 250 may be provided. Further, a bore seal may also be provided but is not illustrated in FIG. 8 for clarity.

Although in the embodiment illustrated in FIG. 8 the sleeve 230 is integrally formed with the composite pipe 230, in a further variation the sleeve may be integrally formed with the pipe stub, and a locking ring may be used to secure the composite pipe, which may include a load profile such as a wedge, to the sleeve/pipe stub.

Figure 9:
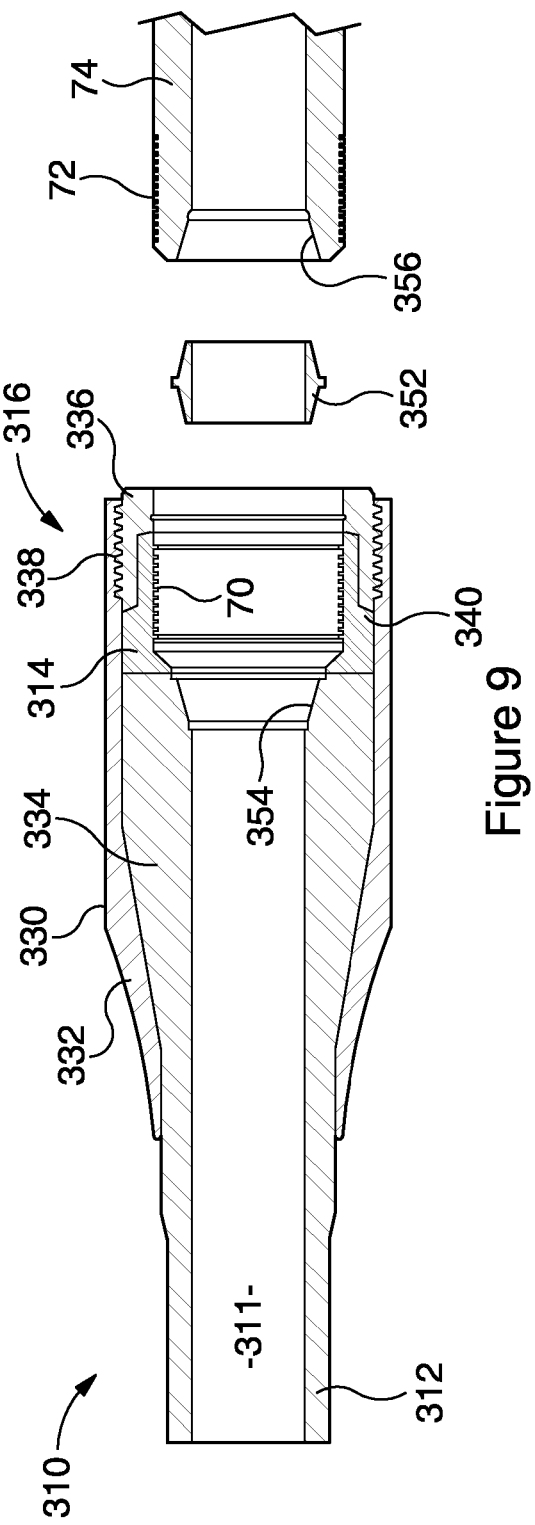
FIG. 9 is a cross-sectional view of an end region of a pipe assembly according to a further embodiment of the present invention.

In the various embodiments described above the pipe assembly includes a pipe stub which is connected to a composite pipe with preloading therebetween. However, in other embodiments a generic connector member may be secured with preloading to the composite pipe, wherein this connector member permits connection with an object, such as a pipe stub or the like. Such an embodiment is illustrated in FIG. 9, reference to which is now made. The pipe assembly 310 of FIG. 9 is similar to assembly 10 of FIG. 1, and as such like features share like reference numerals, incremented by 300.

The pipe assembly 310 defines an internal flow path 311 for conveyance of fluids and/or equipment, and further includes a composite pipe 312 comprising a composite material formed from at least a matrix and a plurality of reinforcing fibres embedded within the matrix (the matrix and reinforcing elements are not individually illustrated). The pipe assembly 310 further comprises a metallic connector member or collar 314 which is secured against an end of the composite pipe 312 via a connection assembly 316. The connector member 314 includes an inner thread 70 which in use is threadedly engaged with a corresponding thread 72 of an object, such as a pipe 74.

The connection arrangement 316 includes a sleeve 330 which extends over the end of the pipe 312, and the connector member 314 is located concentrically within the sleeve to engage the end face of the pipe 312, in some embodiments a component may be interposed between the pipe 312 and connector member 314. In the present described embodiment the sleeve 330 is of metallic construction, for example steel, although other materials may be utilised to form the sleeve 330, such as composite materials. The sleeve 330 defines a wedge shaped load profile 332 at one end thereof which in use engages a complementary wedge shaped load profile 334 formed on the composite pipe 312.

The connection arrangement 316 further comprises a load arrangement in the form of a locking ring 336 which threadedly engages the sleeve 330 via interengaging threads 338. In the present embodiment the locking ring 336 is of metallic construction, for example steel, although other materials may be utilised. In use the locking ring 336 engages a load profile 340, provided in the form of an upset region or hub, formed on the connector member 314. Accordingly, when the connection is made-up, the ends of the pipe 312 and connector member 314, and specifically the wedge profile 334 and upset region 340, become captivated between the sleeve 330 and locking ring 336 to provide a connection therebetween.

The composite pipe 312 and connector member 314 are secured together with a compressive preload defined therebetween. This compressive load, once achieved, is retained by the locking ring 336. In some embodiments tightening of the locking ring 336 relative to the sleeve establishes the compressive preload between the pipe 312 and the connector member 314.

The pipe assembly 310 further comprises a bore seal in the form of a sealing sleeve 352 which spans the interface between the pipe 312 and the connected object/pipe 74. As illustrated in HO, 9, both the pipe 312 and object 74 include respective circumferential recesses 354, 356 which accommodate the sealing sleeve 352, permitting a substantially uniform flow path 311 to be maintained.

It should be understood that the embodiments described above are merely exemplary and that various modifications may be made thereto without departing from the scope of the present invention.

The invention claimed is:

1. A pipe assembly comprising:
a composite pipe comprising a composite material formed of at least a matrix material and a plurality of reinforcing elements embedded within the matrix material; and
a metallic pipe stub having an end region, secured to an end region of the composite pipe for supporting a connector to permit the pipe assembly to be secured to separate infrastructure,
the pipe assembly comprising a connection assembly to secure the metallic pipe stub to the composite pipe,
the composite pipe defining a load profile to engage the connection assembly to permit a connection force to be applied therebetween,
the connection assembly defining a complementary load profile to interengage with the composite pipe load profile,
the composite pipe load profile defining a wedge-shape formed from the same composite material as the composite pipe, wherein the composite pipe defines an extended region of increased wall thickness in the end region thereof and wherein the wedge-shaped load profile is integrally formed with the composite pipe,
the pipe assembly further comprising a bore sealing assembly for providing sealing within a bore of the pipe assembly at the interface between the composite pipe and the metallic pipe stub, and
the bore sealing assembly comprises a sealing sleeve structure which extends between one of the composite pipe and the metallic pipe stub and an engagement member which is interposed between the composite pipe and the metallic pipe stub.

2. The pipe assembly according to claim 1, comprising two metallic pipe stubs, one located at each end of the composite pipe.

3. The pipe assembly according to claim 1, wherein the composite pipe and metallic pipe stub define a similar pressure rating.

4. The pipe assembly according to claim 1, wherein the metallic pipe stub comprises a connector for permitting connection with external infrastructure.

5. The pipe assembly according to claim 1, wherein the metallic pipe stub is configured to receive or be secured with a separately formed connector.

6. The pipe assembly according to claim 1, wherein the metallic pipe stub defines a receiving region for receiving a connector.

7. The pipe assembly according to claim 1, wherein the composite pipe is longer than the metallic pipe stub.

8. The pipe assembly according to claim 1, wherein the composite pipe is at least twice as long as the metallic pipe stub.

9. The pipe assembly according to claim 1, wherein the metallic pipe stub defines a length which is between 1 and 10 times the diameter of said metallic pipe stub.

10. The pipe assembly according to claim 1, wherein the metallic pipe stub defines an internal diameter which is substantially equivalent to an internal diameter of the composite pipe.

11. The pipe assembly according to claim 1, wherein the metallic pipe stub and composite pipe define substantially equal wall thicknesses.

12. The pipe assembly according to claim 1, wherein the metallic pipe stub is mechanically secured to the end region of the composite pipe.

13. The pipe assembly according to claim 1, wherein the metallic pipe stub is mechanically secured to the end region of the composite pipe with preloading therebetween.

14. The pipe assembly according to claim 1, wherein the metallic pipe stub is mechanically secured to the end region of the composite pipe with precompression therebetween.

15. The pipe assembly according to claim 1, wherein the connection assembly extends across an interface between the composite pipe and the metallic pipe stub to provide a connection force therebetween.

16. The pipe assembly according to claim 1, wherein the connection assembly comprises a loading mechanism or arrangement for applying a connection force between the composite pipe and the metallic pipe stub.

17. The pipe assembly according to claim 1, wherein the metallic pipe stub comprises a load profile configured to be engaged by the connection assembly.

18. The pipe assembly according to claim 17, wherein the metallic pipe stub load profile comprises at least one of a wedge profile and a load shoulder.

19. The pipe assembly according to claim 17, wherein the metallic pipe stub load profile is integrally formed with the metallic pipe stub.

20. The pipe assembly according to claim 17, wherein the connection assembly is arranged to apply a connection force between the composite pipe load profile and the metallic pipe stub load profile.

21. The pipe assembly according to claim 1, wherein the connection assembly comprises a sleeve arrangement which extends between the composite pipe and the metallic pipe stub,
wherein the metallic pipe stub comprises a load profile configured to be engaged by the sleeve arrangement.

22. The pipe assembly according to claim 21, wherein the sleeve arrangement comprises or defines the complementary load profile to engage the composite pipe load profile and/or a complementary load profile to engage the metallic pipe stub load profile.

23. The pipe assembly according to claim 21, wherein the sleeve arrangement comprises a sleeve which extends across an interface between the composite pipe and the metallic pipe stub.

24. The pipe assembly according to claim 21, wherein the sleeve arrangement comprises:
a sleeve;

a first locking structure to be secured to the sleeve and which defines a load profile for engaging one of the composite pipe load profile or the metallic pipe stub load profile; and a second locking structure to be secured to the sleeve and which defines a load profile for engaging the other of the composite pipe load profile or the metallic pipe stub load profile.

25. The pipe assembly according to claim 1, wherein the connection assembly defines a region of relief at a portion which engages or is in proximity to the composite pipe.

26. The pipe assembly according to claim 1, comprising an electrical insulation arrangement between the composite pipe and connection assembly.

27. The pipe assembly according to claim 26, wherein at least a portion of the electrical insulation arrangement is integrally formed with the composite pipe.

28. The pipe assembly according to claim 26, wherein the composite pipe comprises a portion including a dielectric composite material.

29. The pipe assembly according to claim 1, wherein the end regions of the composite pipe and the metallic pipe stub are isolated from each other.

30. The pipe assembly according to claim 1, wherein the engagement member is interposed between the end regions of the composite pipe and the metallic pipe stub.

31. The pipe assembly according to claim 30, wherein at least part of the engagement member comprises a composite material formed of at least a matrix and one or more reinforcing elements embedded within the matrix, and the construction of the composite material of the engagement member permits the engagement member to preferentially deform to accommodate the end region of the composite pipe.

32. The pipe assembly according to claim 1, wherein the sealing sleeve structure is mounted internally within the pipe assembly.

33. The pipe assembly according to claim 1, wherein the sealing sleeve structure extends between the composite pipe and the metallic pipe stub.

34. The pipe assembly according to claim 1, wherein the engagement member defines a recess for accommodating the sealing sleeve structure.

35. The pipe assembly according to claim 1, wherein the extended region extends beyond the connection assembly.

36. A pipe assembly, comprising:
a composite pipe comprising a composite material formed of at least a matrix material and a plurality of reinforcing fibers embedded within the matrix material;
a connector member secured to an end region of the composite pipe and defining a connection structure to permit connection of an object to the pipe assembly; and a load arrangement for retaining a compressive load between the composite pipe and the connector member, the pipe assembly comprising a connection assembly, the composite pipe defining a load profile to engage the connection assembly to permit a connection force to be applied therebetween, the connection assembly defining a complementary load profile to interengage with the composite pipe load profile, the composite pipe load profile defining a wedge-shape formed from the same composite material as the composite pipe, wherein the composite pipe defines an extended region of increased wall thickness in the end region thereof and wherein the wedge-shaped load profile is integrally formed with the composite pipe, the pipe assembly further comprising a bore sealing assembly for providing sealing within a bore of the pipe assembly at the interface between the composite pipe and the connector member, and the bore sealing assembly comprises a sealing sleeve structure which extends between one of the composite pipe and the connector member and an engagement member which is interposed between the composite pipe and the connector member.

37. The pipe assembly according to claim 36, wherein the load arrangement provides the compressive load between the connector member and the composite pipe.

38. The pipe assembly according to claim 36, wherein the connector member comprises a pipe stub.

39. The pipe assembly according to claim 36, wherein the connection structure of the connector member comprises a thread configured to permit an object to be threadedly coupled to the pipe assembly.

40. The pipe assembly according to claim 36, wherein the connector member comprises a sleeve which includes a connection profile.

41. The pipe assembly according to claim 36, wherein the load arrangement comprises a sleeve.

42. The pipe assembly according to claim 36, wherein the load arrangement forms part of the connection assembly.

43. The pipe assembly according to claim 36, wherein the connection assembly comprises a sleeve which extends between the composite pipe and the connector member, wherein the connector member is located within said sleeve.

44. The pipe assembly according to claim 43, wherein the load arrangement is secured relative to the sleeve to act on the connector member and retain compression between said connector member and the composite pipe.

* * * * *